United States Patent [19]

Waddington

[11] 3,803,932

[45] Apr. 16, 1974

[54] WADDINGTON DRIVE

[76] Inventor: Clive Waddington, 180 Euclid Ave., Stratford, Conn. 06497

[22] Filed: July 26, 1972

[21] Appl. No.: 275,221

[52] U.S. Cl. .................................................. 74/117
[51] Int. Cl. ............................................ F16h 29/04
[58] Field of Search ...................... 74/117; 192/6 A

[56] References Cited
UNITED STATES PATENTS

| | | | |
|---|---|---|---|
| 3,448,627 | 6/1969 | Brooks | 74/117 |
| 931,656 | 8/1909 | Sangster | 192/6 A |
| 994,359 | 6/1911 | Archer | 192/6 A |
| 2,148,837 | 2/1939 | Roes | 74/117 |
| 2,508,971 | 5/1950 | Schlote | 74/117 |
| 2,983,154 | 5/1961 | Neukirch | 74/117 |
| 3,229,549 | 1/1966 | Riedl | 74/117 |
| 3,257,868 | 6/1966 | Preece | 192/6 A |
| 3,293,946 | 12/1966 | Gleasman | 192/6 A |
| 3,351,165 | 11/1967 | Shimano | 192/6 A |
| 3,422,690 | 1/1969 | Mendez et al. | 74/117 |

Primary Examiner—Benjamin W. Wyche
Assistant Examiner—Wesley S. Ratliff, Jr.
Attorney, Agent, or Firm—Charles M. Hogan; Gary M. Gron

[57] ABSTRACT

A Waddington drive is positioned within a hub, each as a bicycle hub, and connected between the hub and an operator-powered sprocket. In one form the drive is torque responsive and varies its ratio to maintain a constant input torque to the sprocket, thereby permitting the operator to pedal at an optimum pace while providing optimum torque output to the wheels. In another form the drive is torque responsive as a function of input R.P.M. thereby enabling the operator to pedal at a selected pace and still satisfy the output torque requirements.

20 Claims, 12 Drawing Figures

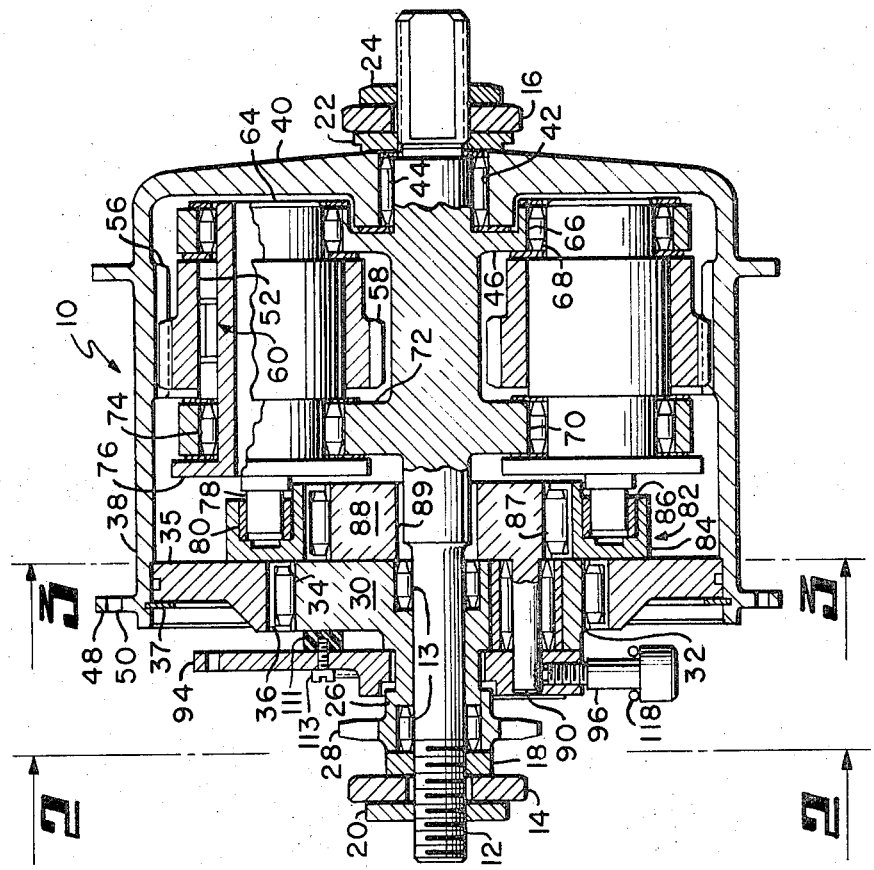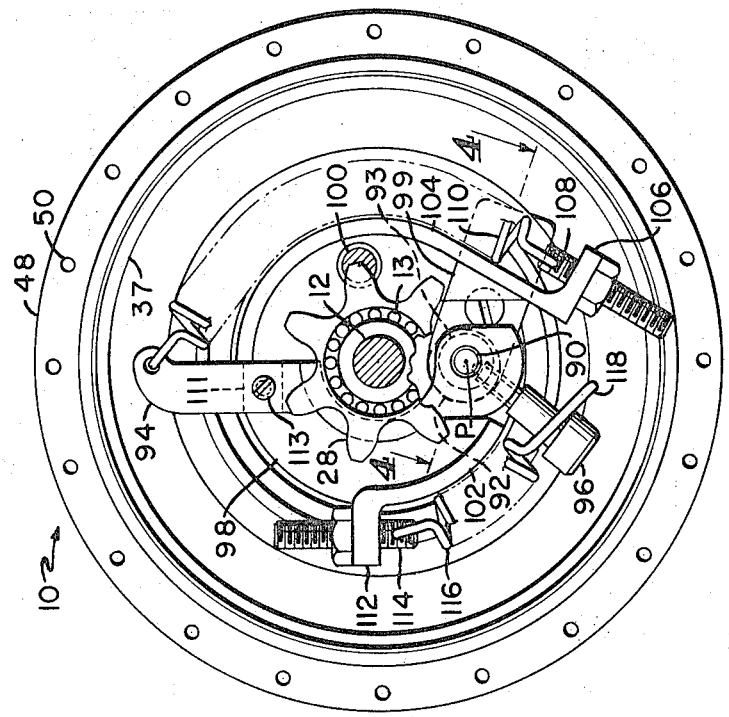

WADDINGTON DRIVE

BACKGROUND OF THE INVENTION

Variable-stroke drives have been utilized for quite a number of years as a means to provide a stepless variable ratio transmission. Generally speaking, these drives comprise a variable-stroke linkage which reciprocate crank arms connected to output gears through one-way clutches. With a given input speed the length of stroke of the crank arm determines the resultant output speed of the transmission.

Although these types of transmissions have been effective for many different applications, they have not been used as integral parts of a driven wheel assembly owing to their general complexity and size. This is particularly true for a drive that would be used as a bicycle transmission.

Heretofore, hub-mounted bicycle drives have been two or three speed arrangements with either manual or torque-responsive shifting of the gears. These transmissions fail to provide the precise tailoring of the gear ratio to the optimum pedaling rate that can be produced by the bicycle rider. The use of the distinct gears results in torque input requirements that, for a large portion of the operating range, is a compromise.

SUMMARY OF THE INVENTION

In its broader aspects the invention comprises a variable-stroke drive with at least one rotatable output element. A rotatable input element has a generally cylindrical cam means displaceable between a first position wherein its effective center is eccentric with respect to the axis of rotation of the input element and a second position wherein its center is closer to the axis. A crank arm pivoted at one end has a follower at the other end which is actuated by the cylindrical cam for pivoting cyclic movement. The stroke of the movement is proportional in angular displacement to the distance of the effective center of the cam from the axis of rotation. A one-way clutch connects the pivoted end of the crank arm to the output element for rotating movement of the output element in one direction only in response to movement of the crank arm, thereby producing an input-output speed ratio generally proportional to the distance of the effective center of the cam means from said axis. A means responsive to the torque across the drive automatically displaces the cam means between the first and second positions.

In another aspect of the invention the above variable-stroke drive incorporates a means responsive to torque across the drive as a function of the rate of rotation of the input element automatically displaces the cam means between the first and second positions.

The above and other related features of the present invention will be apparent from a reading of the description of the disclosure shown in the accompanying drawings and the novelty thereof pointed out in the appended claims.

In the drawings:

FIG. 1 is a longitudinal section view of a stepless variable-stroke drive embodying the present invention and installed in the hub of a pedal-powered vehicle with which it may be used;

FIG. 2 is a cross-sectional view of the variable-stroke drive of FIG. 1, taken on line 2—2 of FIG. 1;

Figure 3:
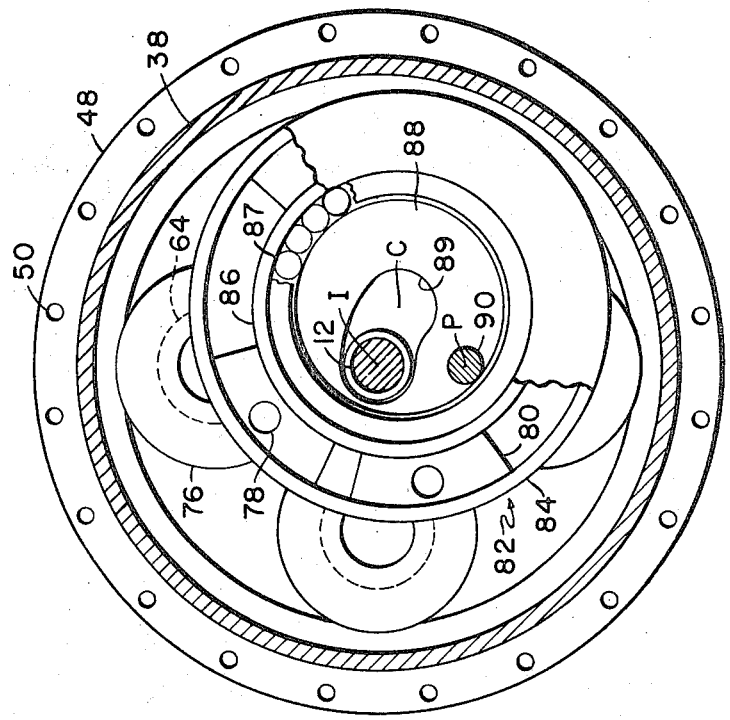
FIG. 3 is a cross-sectional view taken on line 3—3 of FIG. 1.

FIG. 1 shows a variable-stroke drive, generally indicated as 10, used in connection with a bicycle hub driven by an operator-manipulated pedal. However, it is important to note that the drive may be used in other types of operator-driven devices, including hoists, winches, etc. In addition, it may also be used for motor-driven drives with equal results.

The drive 10 comprises a central support shaft 12 secured to forks 14 and 16 of a bicycle (not shown) by a threaded sleeve 18 and nut 20 on one side and a threaded sleeve 22 and nut 24 on the opposite side. The central support shaft 12 journals an input element comprising a shaft 26 journaled over shaft 12 by needle bearings 13. Shaft 26 has an integral sprocket gear 28 at one end and a radially extending annular flange 30 at the other end. The outer periphery of flange element 30 has an integral bearing race 32 for a series of anti-friction elements 34, such as rollers, which also ride in an integral race 36 on an annular disc 35. Disc 35 is retained within the open end of an annular hub 38 by a clip 37. The opposite end of hub 38 has an integral end wall 40 having an opening 42 for anti-friction elements 44 which journal the end wall 40 over shaft 12. Hub 38 has integral flanges 48 which have suitable spoke-receiving holes 50 so that a spoked wheel may be mounted on the hub in the usual fashion.

The interior side of the hub 38 has, as herein shown, an integral ring gear 56. A series of spur gears 58 are journaled for rotation within the hub 38 and mesh with the ring gear 56. As herein shown, particularly in FIG. 3, there are four spur gears with their axes at 90° intervals with respect to the axis of the ring gear 56. It should be noted that, depending upon the application, different numbers of spur gears may be employed. Each of the spur gears 58 has a longitudinal axial bore 52 and is telescoped over an annular one-way clutch, generally indicated at 60. Many types of one-way clutches may be used for this purpose. A clutch particularly suitable for this purpose is available from The Torrington Bearing Company, Torrington, Conn., under Part No. RCB-121616. The one-way clutches 60 are telescoped over shafts 64 which are journaled in opening 66 in an end flange 46 of shaft 12 by bearings 68 at one end. At the other end they are journaled through openings 70 in an intermediate flange 72 by bearings 74.

As shown particularly in FIG. 3, the shafts 64 have integral crank arm flanges 76 with pins 78 radially spaced from the axis of rotation of the shafts 64. These pins 78 are received in arcuate shoes 80 actuated by a generally cylindrical cam, indicated generally by reference character 82. As herein shown, the cam comprises a generally cylindrical raceway 84 having a circular groove 86 in which the shoes 80 are received. This raceway 84 is journaled over a cylindrical ratio plate 88 by a bearing 87.

Figure 4:
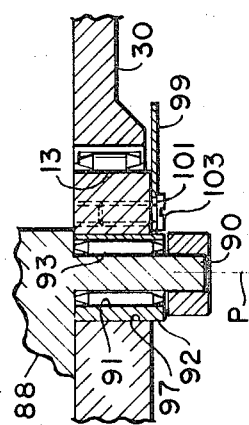
FIG. 4 is a fragmentary longitudinal section view of the drive of FIG. 1 taken on line 4—4 of FIG. 2.

Ratio plate 88 has a shaft 90 which is journaled in a bore 91 of a sleeve 92 by bearing 93. The outer periphery of sleeve 92 is received in a hole 97 in flange 30. As particularly shown in FIG. 4, the effective center of the bore 91 in sleeve 92 is offset from the effective center of the periphery.

Sleeve 92 has an integral arm 99 which is capable of pivoting motion so as to vary the distance of the effective center P of the shaft 90 from the effective center I of the input flange 30. An arcuate slot 101 in arm 99 receives a cap screw 103 which holds the arm in a preselected position.

The ratio plate 88 has an arcuate slot 89 permitting it to pivot to the position shown in FIG. 3 where the effective center C of the cylindrical cam 82 is eccentric and at a maximum distance from the axis of rotation I of the annular flange 30. From this position the ratio plate 88 can pivot so that the effective center C of the cam 82 is closer to the axis of rotation I. As described below, the distance from the effective center C of the cam 82 to its pivot axis P is adjusted to be greater than the distance from the pivot axis P to the axis I of the flange 30. When the effective center C of the cam 82 is in its least eccentric position its degree of eccentricity is equal to CP minus IP. By pivoting arm 99, the distance IP can be varied to achieve a given value of CP − IP providing a predetermined torque curve for the drive.

A control arm 94 is secured to shaft 90 by a set screw 96. A support plate 98 is releasably secured to flange 30 by a screw 100. Support plate 98 has integral arcuate flanges 102 and 104. Flange 104 has an end bracket 106 through which a threaded shaft 108 is received to adjustably mount one end of a spring 110 to the support plate 98. The spring 110 wraps around flange 104 to minimize the overall diameter of the drive and connects with arm 94 to pivot shaft 90 in a direction which places the cam 82 in a position of eccentricity. Flange 102 has an integral end bracket 112 receiving a threaded shaft 114 for adjustably mounting to the support plate 98 a second spring 116. Spring 116 wraps around flange 102 and has an elongated hook end portion 118 positioned around set screw 96. The elongation is sufficient so that spring 116 will only act on set screw 96 when the effective center C of the cylindrical cam is relatively close to the axis I of the flange 30.

During operation of the bicycle, sprocket 28, input flange 30 and the ratio plate 88 rotate in unison. The ratio plate 88 has a varying degree of eccentricity with respect to the flange 30 so that the ratio plate rotates about a point spaced from its center. The cylindrical cam 82 is telescoped over the ratio plate and it follows the same motion. The cylindrical cam 82, however, is journaled with respect to the ratio plate and the friction of the sequentially loaded shoes 80 on the cylindrical groove 86 prevents it from rotating with the ratio plate. This eliminates any sliding frictional loss between the shoe loaded at any particular time and the surface of the groove 86. This eccentric motion of the cylindrical cam 82 actuates the shoes 80 to produce a cyclic pivoting motion on the crank arm flanges 76. The one-way clutches 60 transmit the motion in one direction only to the spur gears 58, thereby producing a rotary movement in response to the cyclic pivoting motion of the crank arm flanges.

Each one of the shafts is pivoted sequentially as the cylindrical cam 82 rotates in this eccentric fashion. The shafts 64 experience an instantaneous angular velocity variation generally similar to a sine wave. Since each of the shafts are pivoted sequentially, the output is the combination of all of the motions. Because of the one-way clutch each shaft drives the pinion gear only when its angular velocity exceeds that of the other shafts. The output R.P.M. generally follows a line approximating the maximum angular velocity for each one of the shafts. The degree of eccentricity of the cam 82 determines this angular velocity and thus determines the speed ratio of the drive. For maximum eccentricity a maximum speed is produced for a given input speed. The output speed is decreased as the cam is moved from this position and at the same time the output torque is increased.

When the shoes 80 are in a trailing configuration relative to the axis of the shafts 64, the angular velocity curve of the shafts has a rather steep rise and a generally flat maximum level and a rather steep decrease and negative angular velocity. This tends to smooth the output of the drive, particularly when the drive is operated with the effective center C of the cylindrical cam relatively close to the axis I of the flange 30. Other arrangements, such as shoes in a leading configuration, may also be used for different applications.

Figure 5:
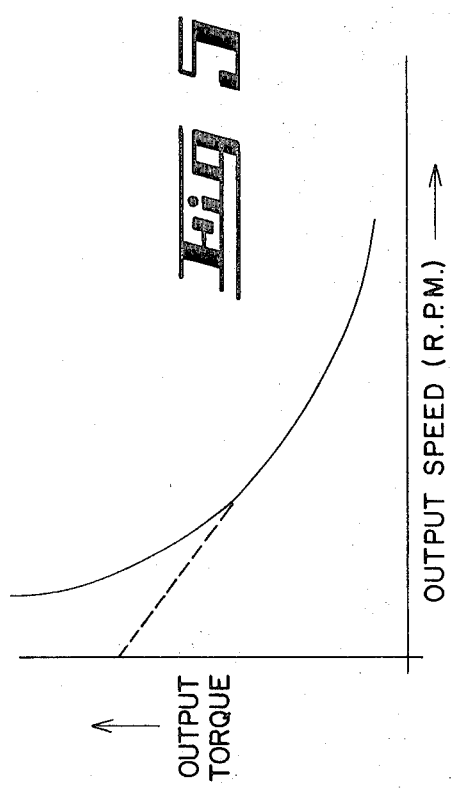
FIG. 5 is a graph illustrating the relationship of output torque to output R.P.M. for the drive shown in FIG. 1.

When the cylindrical cam is in the eccentric position the mean force reaction of the shoes 80 on the cam 82 is at 90° to a line drawn through the effective center C of the cylindrical cam and the center of rotation I of the annular flange 30. This force F acts through the effective center C of the cylindrical cam, as shown in FIG. 3. The force F is offset from the pivot axis P of the ratio plate 88 so that it produces a torque moment about this pivot urging the ratio plate 88 toward a position closer to the axis of the input flange 30 (in a clockwise direction as shown in FIG. 3). The force reaction of the shoes 80 produces a torque moment that urges the ratio plate 88 toward a less eccentric position, thereby decreasing the output speed for a given input speed. This is balanced by the force of the springs so that the net effect is to produce a speed ratio that varies the output torque to enable a constant input torque. This is readily apparent from FIG. 5 showing the output torque and output speed of the drive. The springs produce a curve of output torque versus output speed generally following the form of a hyperbola which enables the operator to pedal at an optimum rate irrespective of output torque demands so that he can pedal at an optimum pace. If the system did not have spring 116 the curve would follow the dotted line for conditions of low output speed. However, at this point the hooked portion 118 of the spring 116 engages the set screw 96 to increase the force with which the cylindrical cam is urged toward the eccentric position.

As the rider is pedaling at this optimum rate, any variations in the output torque requirements, such as going up a hill or down a hill, are sensed through the force reaction of the shoes on the cam thereby causing the gear ratio to change, thus increasing or decreasing the input torque to match the output torque requirements. Thus it can be seen that the drive infinitely tailors the speed ratio and in effect the torque multiplication to satisfy precisely the output torque requirements of the bicycle.

When the ratio plate 88 is in its position where it is closest to the center I of the input element, it is spaced from I an amount equal to CP − IP. In this position the force reaction of the shoes follows the same rule as above and is normal to a line extending through the effective center C of the cam, the axis I of the input element, and in this case through the pivot axis P of the ratio plate 88. The force acts through the effective center C of the cylindrical cam in the direction which urges the ratio plate toward a position of less eccentricity. This stabilizes the operation of the drive at low speed ratios. If the force reaction was not so tailored there would be no force in this position holding the cam toward the center and it would tend to oscillate about this point. The distance necessary to achieve this result may be made very small and it has been found that a dimension of 0.001 inch is adequate for this purpose. The eccentric sleeve 92 enables this value to be achieved by adjustment, thereby minimizing the necessity for extremely precise manufacturing techniques for producing the components. Furthermore, this adjustment determines the torque characteristics of the drive.

The above drive varies its ratio fast enough to compensate for any variation in torque across the drive. When the input element is operator driven through a foot pedal system there tends to be a cyclic variation in input torque that would unnecessarily vary the ratio. To minimize this effect a damping device is provided to damp the swing of arm 94. This damping device may take many forms, e.g., a hydraulic, pneumatic or viscous dashpot connected between arm 94 and plate 98 or a friction damper between these parts. As shown in FIGS. 1 and 2, the damper may take the form of a friction element 111 secured to arm 94 by screw 113 so that friction element 111 engages plate 98 to damp the movement of arm 94. Screw 113 is tightened or loosened to vary the height of element 111 and vary the degree to which it frictionally engages plate 98. This enables the damping characteristics to be precisely tailored to the particular application for the drive.

Figure 6:
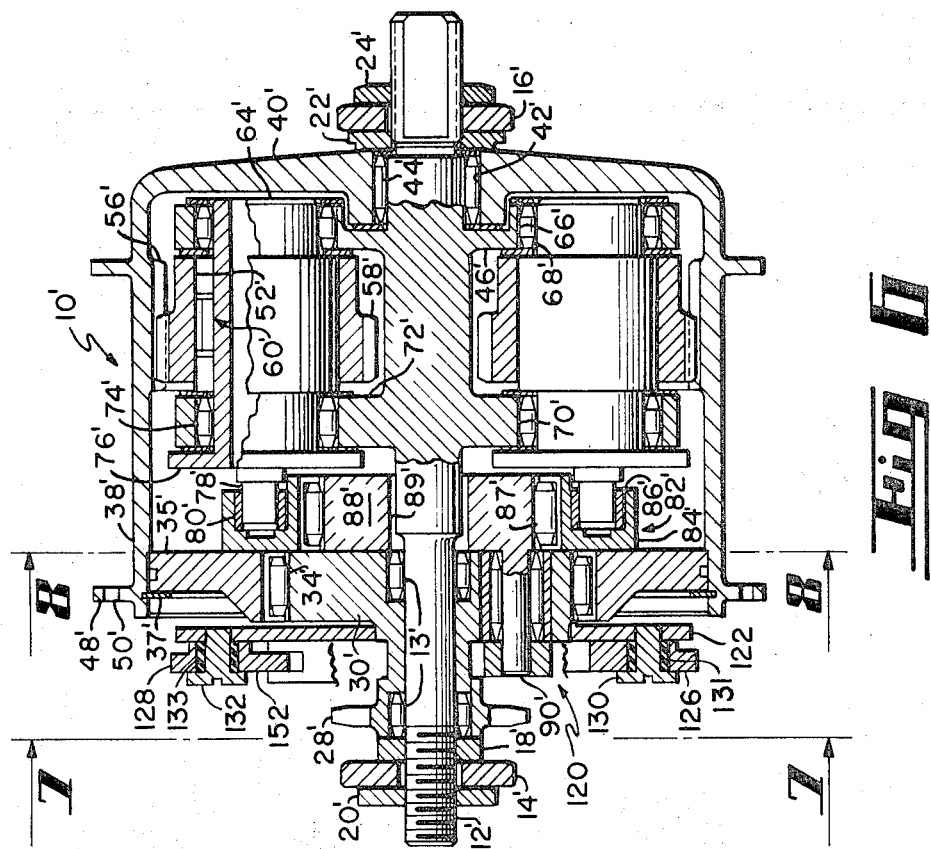
FIG. 6 is a longitudinal section view of a stepless variable-stroke drive incorporating an alternate embodiment of the present invention.
Figure 7:
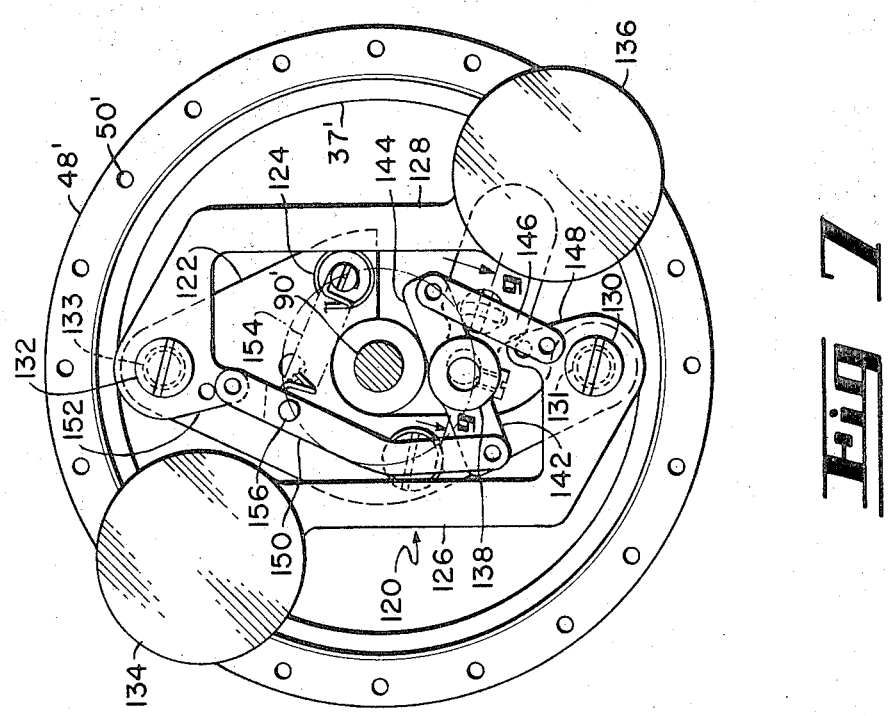
FIG. 7 is a view of the drive of FIG. 6 taken on line 7—7 of FIG. 6.
Figure 8:
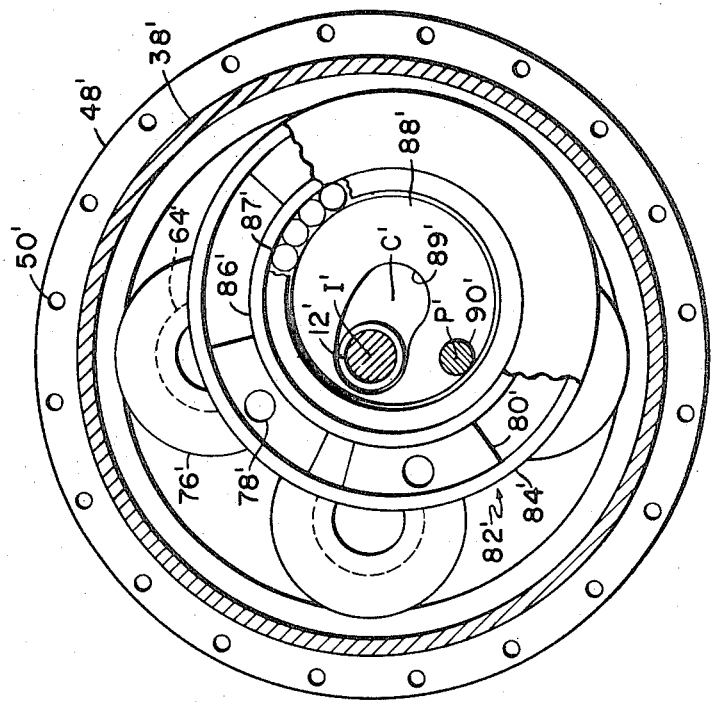
FIG. 8 is a cross-sectional view of the drive of FIG. 6 taken on line 8—8 of FIG. 6.
Figure 10:
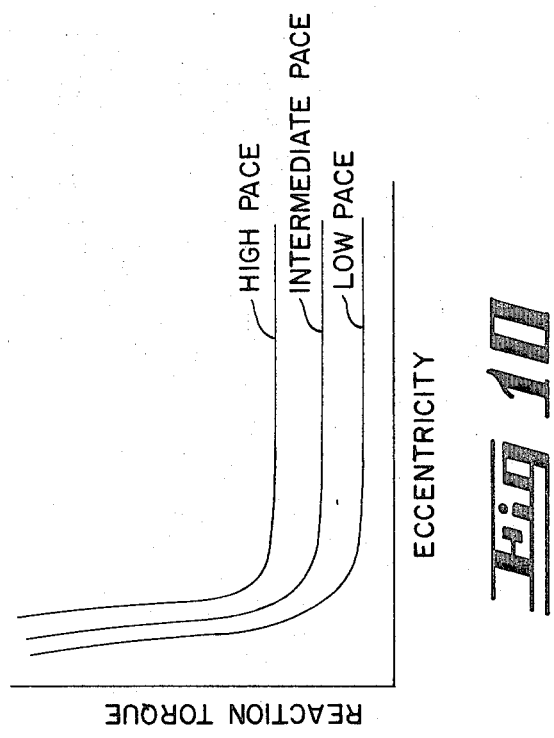
FIG. 10 is a graph showing output torque versus output speed for the drive shown in FIGS. 6–9.
Figure 9:
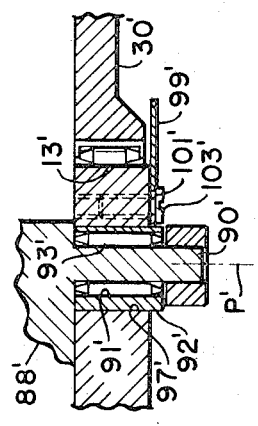
FIG. 9 is a fragmentary section view taken on line 9—9 of FIG. 7.

The above drive is particularly suited for an input having a constant torque or horsepower requirement, such as motors and other devices in which it is desired to operate them at a given speed and horsepower output. However, for a bicycle there are many instances in which it is desirable to enable an operator to pedal the bike at varying output levels. The transmission shown in FIGS. 6, 7 and 8 is particularly suited for this purpose.

This drive is identical to the drive of FIGS. 1–4 so that a detailed description of its components will not be undertaken, with the exception of the control mechanism indicated by reference character 120 for pivoting the ratio plate 88'. This mechanism comprises a support plate 122 secured to the input flange 30' by a screw 124. A pair of centrifugally responsive arms 126 and 128 are pivotally mounted to the support plate 122 by screws 130 and 132, respectively. Sleeves 131, 133 of flexible friction material are positioned between screws 130, 132 and the arms 126, 128, respectively. Tightening or loosening screws 130, 132 varies the frictional resistance to the pivoting of arms 126, 128, thereby damping their movement a given amount.

Arms 126 and 128 have weights 134 and 136 at their free ends to magnify the outward urging of the arms in response to rotation of the input flange 30'. The pivoting movement of the arms 126 and 128 is transmitted to the shaft 90' by a sleeve 138 suitably secured to shaft 90' and having tabs 142 and 144 at opposite ends. A link 146 is pivotally connected to arm 126 at a tab 148 away from the axis of screw 130 and to the free end of tab 144. A second link 150 is pivotally connected to the free end of tabs 142 and to arm 128 at a tab 152 spaced from the axis of screw 132.

The above arrangement of linkages causes the shaft 90' to be pivoted from the illustrated least concentric position in a clockwise direction to the position of maximum eccentricity in which the weights 134 and 136 are moved radially outward from the axis of the flange 30'. If it is desired to do so the arms 126 and 128 may be biased to this outward position by a spring 154 connecting to link 150 through a hole 156 and to screw 124.

The operation of this arrangement takes place as follows. Rotation of the input sprocket 28' at a given rotational rate causes the weights 134 and 136 to swing outward with a centrifugal force that is a predetermined function of the rotational would of the flange 30'. By means of the linkage this force is transmitted to the shaft 90' as a torque acting to yieldably urge the ratio plate to a position where it produces a maximum output speed for a given input speed. This torque is opposed by the torque caused by the force reaction of the shoes 80 on the cam 82, as described above. The result of this is that he 24 for a given input speed 28 the control apparatus 120 maintains a unique input torque by automatically varying the ratio of the drive so that the output torque requirements are satisfied. For another input speed, for example a higher one, the weights would produce a higher torque moment about the shaft 90' urging it to the extended position. For this case a higher input torque is called for by the drive so that the gear ratio is automatically varied to maintain the input torque at this higher level irrespective of the output torque requirements. It can be seen that for high input rotational rates (for a bicycle a high pedal rate) a high input torque is maintained. For lower input R.P.M., however, a lower input torque rate is maintained. This enables the operator of a bicycle, for example, to exert the precise amount of effort he wishes from a very low level, in which he is simply cruising, up to a maximum output level. In all situations between, the drive automatically adjusts the speed ratio to multiply the input torque called for at that particular input speed to match precisely the output torque requirements of the vehicle.

The linkage of the above control system is arranged so that the screws 130, 132 which pivotally mount arms 126 and 128, respectively, are on a straight line defined by the pivotal end connections of the links 150 and 146 for the ratio plate position of minimum eccentricity. In this position the centrifugal force acting on weights 134 and 136 produces an infinite torque on the shaft 90' acting to urge the ratio plate 88' toward the eccentric position. As soon as the arms 126 and 128 are pivoted, the points 148 and 152 displace out of this line so that the torque produced by the centrifugal force acting on the weights 134 and 136 rapidly decreases. As the weights swing out further to their maximum extended position, the centrifugal force produces a torque on shaft 90' which is solely a function of the input speed and is constant with respect to the degree of eccentricity of the ratio plate 88'.

The reaction forces on cam 82' described in connection with FIGS. 1–4 produce a reaction torque on shaft 90' in opposition to the torque produced by the control system which follows the same characteristics when the distance (C'P' − I'P') is relatively small. In other words, when the distance (C'P' − I'P') is relatively small, such as 0.001 inch, the mean force vector has a fairly uniform orientation with respect to the axis P' about which it produces the torque moment for positions of eccentricity up to a point just before the axes C', P' and I' lie on the same line. At this point the reaction force rapidly increases.

This is illustrated in FIG. 8 which shows reaction torque as a function of eccentricity of ratio plate 88'. It can be seen that for a given input R.P.M., e.g. intermediate pace, as the eccentricity decreases the reaction torque is essentially constant until a relatively low eccentricity at which point it rapidly increases. The torque curve produced by the control system is substantially identical so that the drive gives a uniform control of torque for all positions of eccentricity of the drive. Thus the control of the ratio plate 88' to meet the output torque requirements is independent of the degree of eccentricity of ratio plate 88'. It is seen that the operator can pedal at any rate varying from a low pace through an intermediate pace to a high pace and have the drive automatically adjust the ratio to satisfy the output torque requirements while maintaining the input torque, unique to the rate at which he is pedaling.

The inertia of the weights 134, 136 tends to damp out the cyclic variations torque when the input element 30' is pedal driven. The sleeves 131 and 133, however, enable the movement of arms 126, 128 to be damped to the degree required for efficient operation of the drive.

Figure 11:
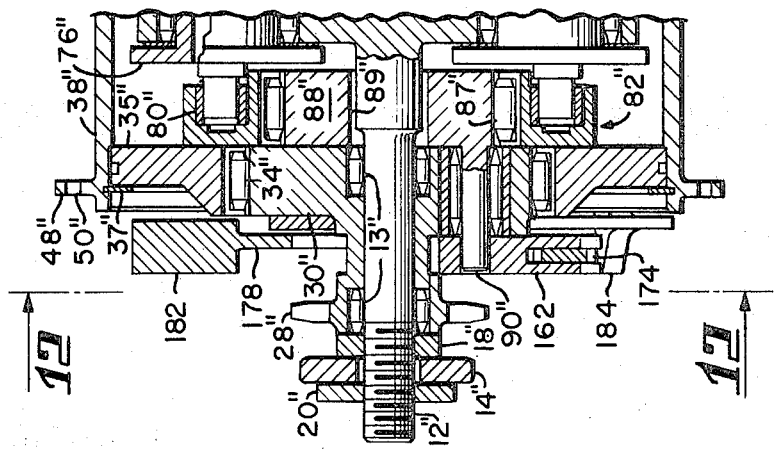
FIG. 11 is a fragmentary longitudinal section view of a stepless variable-stroke drive showing still another embodiment of the present invention.
Figure 12:
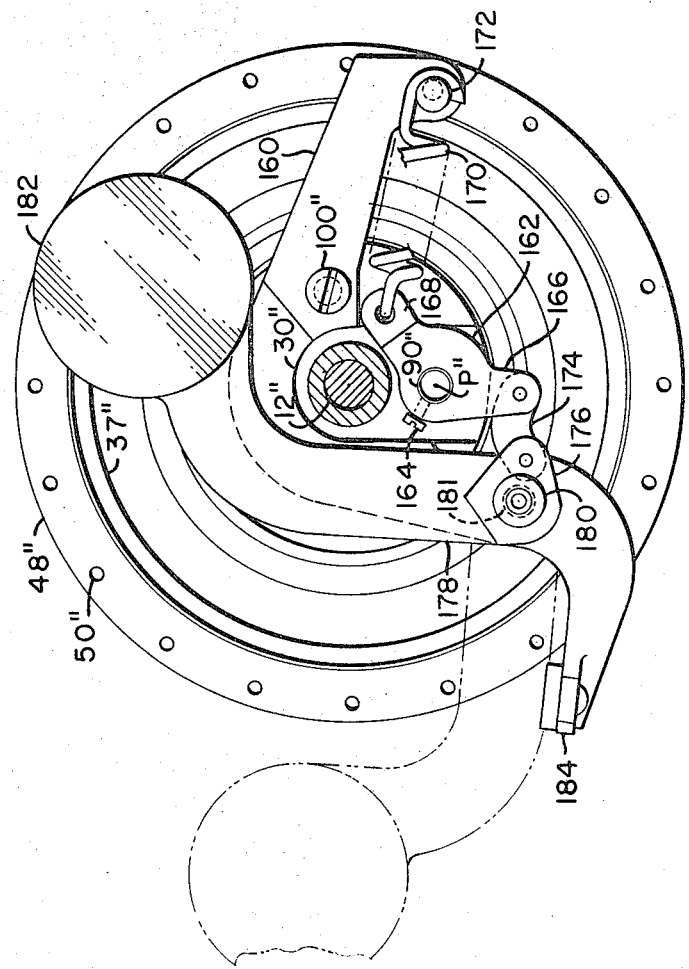
FIG. 12 is a view taken on line 12—12 of FIG. 11.

The control system in FIGS. 11 and 12 illustrates still another embodiment which has a single centrifugally responsive element. This control assembly comprises a support plate 160 releasably secured to the input flange 30'' by the set screw 100''. An element 162 secured to shaft 90'' by set screw 164 has first and second integral tabs 166 and 168. Tab 168 connects with one end of a spring 170 extending to a screw 172 eccentric with respect to its mounting. Twisting screw 172 varies the length of the spring 170 relative to tab 168. Tab 166 pivotally connects with a link 174 extending to a tab 176. Tab 176 is supported on an arm 178 pivotally mounted to plate 160 by a screw 180. A sleeve 181 of flexible friction material is provided between screw 180 and arm 178 to adjustably damp its pivoting movement as in the previous two drives discussed. Arm 178 has a weight 182 at its free end which moves outward in response to centrifugal force produced by rotation of the input flange 30''. A stop 184 limits the outward swing of the arm 178.

Both the spring 170 and the arm 178 produce a torque moment about shaft 90'' urging it to the eccentric position. The screw 172 for the spring 170 is positioned relative to the pivot axis P'' of shaft 90'' so that when the cylindrical cam 82'' is in a position of maximum eccentricity the connecting point of tab 168 is on a line extending through the pivot axis P'' and the screw 172. In this position the spring produces a negligible torque on the shaft 90''. However, as the shaft 90'' pivots toward a less eccentric position, the tab 168 swings out from this line thereby increasing the torque the spring 170 applied to the shaft 90' to a maximum for the position of minimum eccentricity shown.

The linkage for the centrifugally responsive arm 178 is arranged to produce substantially a uniform torque over the range of eccentricity with a sharp increase in its effect near the position of minimum eccentricity as described for the embodiment of FIGS. 6 and 7.

The combination of the torques contributed by the centrifugally responsive arm 178 and the spring 170 produces a control curve that for a given input speed is similar to the curve for the drive of FIGS. 1–4, shown in FIG. 5. This is a curve which has a more gradual increase in the control torque as a function of eccentricity than the control system discussed in FIGS. 6 and 7. This control characteristic is matched by adjusting the dimension (P'' C'' − P'' I'') to a value greater than that for the embodiment of FIGS. 6 and 7. This produces a torque reaction response that follows the curve for the control system. As a result, the output torque requirements are satisfied by varying the ratio for each input speed to produce a family of curves. These enable the operator to pedal at the precise rate he wishes to while still matching the output torque requirements of the vehicle. The damping provided by sleeve 181 may be adjusted to minimize, if not eliminate, cyclic variations in the ratio as discussed above.

While the drives embodying the present invention have been described in connection with bicycle transmissions, it should be apparent to those skilled in the art that they may be employed in different forms in other applications, such as hand-powered winches, hoists, etc. In addition, they may be incorporated in motor driven devices with the same results. Furthermore, the number of gears and arrangements can be tailored to many different situations.

Having thus described the invention, what is claimed as novel and desired to be secured by Letters Patent of the United States is:

1. A stepless variable-stroke drive comprising:
at least one output element journaled for rotation;
an input element journaled for rotation and having a generally cylindrical cam means including a shaft journaled to said input element for pivotal displacement of said cam means between a first position wherein its effective center is eccentric with respect to the axis of rotation of said input element and a second position wherein the effective center is closer to said axis;
crank arm means having a follower at one end, said follower being actuated by said cam means for pivoting cyclic movement of said crank arm means about the other end thereof, the stroke of said movement being proportional in angular displacement to the distance of the effective center of said cam means from said axis;
a one-way clutch connecting the other end of said crank arm means to said output element for rotating movement of said output element in one direction only thereby producing an input-output speed ratio generally proportional to the distance of the effective center of the cam means from said axis;

first and second yieldable urging means connected to said input element and acting on the shaft of said cam means to produce a torque moment about the pivotal mounting thereof in a direction urging it toward said first position, said first yieldable urging means producing a first torque moment when the cam means is adjacent said first position and said second and first yieldable urging means producing a second higher torque moment when the effective center of said cam means is a relatively short distance from said axis.

2. A stepless variable-stroke drive as in claim 1 wherein said yieldable urging means comprises:
   a first spring connected to said input element and to the pivotal mounting for said cam means for yieldably urging said cam means toward said first position; and
   a second spring connected to said input element for yieldably urging said cam means toward said first position only when said cam means has its effective center relatively close to said axis.

3. A stepless variable-stroke drive as in claim 2 wherein:
   said means for pivotally mounting said cam means comprises a shaft journaled by said input element and connected to said cam means at one end thereof, said shaft having at the other end thereof a radial arm secured thereto by a set screw;
   said first spring is connected to said radial arm and to said input element;
   said second spring is connected to said input element and having an elongated hook surrounding said set screw and having a length such that said spring acts on said set screw only when the effective center of said cam means is relatively close to said axis.

4. A stepless variable-stroke drive as in claim 3 wherein:
   said shaft for pivotally mounting said cam means extends through said input element and has the cam means in the interior of said drive and said radial arm on the exterior thereof;
   said input element further comprises an axially extending flange around which said springs are wrapped to minimize the radius thereof; and
   said drive further comprises means for adjustably mounting said springs to said input element thereby varying the force they exert on said shaft.

5. A stepless variable-stroke drive as in claim 1 wherein said cam means comprises:
   a generally circular ratio plate having a shaft offset from the center thereof, said shaft being journaled in said input element at a point spaced from the axis of said input element;
   a cylindrical cam telescoped over said ratio plate, said cylindrical cam contacting said follower; and means for journaling said cylindrical cam relative to said ratio plate whereby the friction of said follower on said cam prevents said cam from rotating with said ratio plate.

6. A stepless variable stroke drive as in claim 5 wherein:
   said cylindrical cam comprises a generally circular cam plate having a circular groove therein; said follower comprises an arcuate shoe received in said circular groove and is pivotally mounted to said crank arm means.

7. A stepless variable-stroke drive as in claim 6 wherein:
   said crank arm means includes an element journaled about a fixed axis and having a pin radially outward from said axis and connecting with said follower;
   said follower being positioned relative to the axis of rotation of said crank arm in a following relationship compared to the rotation of said input element.

8. A stepless variable-stroke drive as in claim 1 further comprising means for adjustably positioning the pivotal mounting of said cam means relative to the axis of said input element, thereby producing a predetermined relationship between the distance from the effective center of said cam means to the pivotal mounting thereof and the distance from the pivotal mounting to the central axis of said input element.

9. A stepless variable-stroke drive as in claim 8 wherein said adjustable positioning means comprises:
   a sleeve having an opening through which said shaft is telescoped, the outer periphery of said sleeve being journaled through said input element, the axis of the opening through which said shaft is telescoped being offset from the axis of the peripheral surface of said sleeve;
   an arm extending from one end of said sleeve whereby said arm may be pivoted to vary the distance of the axis of said shaft from the axis of said input element; and
   a releasable holding means for holding said arm in a predetermined position.

10. An automatic variable ratio drive for a bicycle, said drive comprising:
    a wheel hub mounted for rotation on said bicycle;
    a pedal-driven sprocket also mounted for rotation on said bicycle;
    a stepless variable-stroke drive having a speed ratio proportional to the stroke thereof positioned within said hub and connecting said hub and said driven sprocket;
    means responsive to the torque across said drive for varying the stroke of said variable ratio drive to maintain the input torque as a direct function of the R.P.M. of said sprocket.

11. An automatic variable ratio drive for a bicycle, said drive comprising:
    a fixed central shaft mounted on said bicycle;
    an annular output hub journaled for rotation on said fixed central shaft, said hub being the hub of a driven wheel for said bicycle;
    an input element including an operator driven sprocket also journaled for rotation on said fixed central shaft;
    at least one rotatable output element rotatably journaled on said central shaft and drivingly engaging said hub;
    a generally cylindrical cam means pivotally connected to said input element through a shaft journaled in said input element at a point spaced from the axis of rotation of said input element, said shaft having a radially extending arm secured thereto;
    yieldable urging means supported by said input element and said cam means, said yieldable urging means comprising a first spring connected to said arm and to said input element and a second spring connected to said input element and having an elongated hook surrounding said set screw such that said second spring acts on said set screw only when the effective center of said cylindrical cam means is closely adjacent said axis;

a crank arm means positioned within said hub and having a follower at one end, said follower being actuated by said cylindrical cam means for pivoting cyclic movement of said crank arm means about the other end thereof, the stroke of said movement being proportional in angular displacement to the distance of the effective center of said cylindrical cam from said axis; and a one-way clutch connecting the other end of said crank arm means to said output element for generally rotating movement of said hub in one direction only, thereby producing an input-output speed ratio generally proportional to the distance of the effective center of said cylindrical cam means from said center, said cam assuming a position of eccentricity determined by the opposing force of said springs and the reaction force of said follower on said cam means.

12. A stepless variable-stroke drive comprising:

at least one output element journaled for rotation;

an input element journaled for rotation and having a generally cylindrical cam means displaceable between a first position wherein its effective center is eccentric with respect to the axis of rotation of said input element and a second position wherein the effective center is closer to said axis;

crank arm means having a follower at one end, said follower being actuated by said cam means for pivoting cyclic movement of said crank arm means about the other end thereof, the stroke of said movement being proportional in angular displacement to the distance of the effective center of said cam means from said axis;

a one-way clutch connecting the other end of said crank arm means to said output element for rotating movement of said output element in one direction only thereby producing an input-output speed ratio generally proportional to the distance of the effective center of the cam means from said axis;

means for mounting said cam means on said input element for displacement between said positions in a given direction so that the torque across said drive as reflected by the reaction forces between said follower and said cam means urges said cam means toward said second position;

means connected between said input element and said cam means for yieldably urging said cam means toward said first position with a predetermined force varying as a function of the rotational rate of said input element.

13. A stepless variable-stroke drive as in claim 12 wherein:

said means for pivotally mounting said cam means includes a shaft journaled by said input element and connected to said cam means;

said variable torque means comprises at least one arm pivotally mounted on said input element and having a weight at the free end thereof displaceable radially outward in response to rotation of said input element, and a linkage connecting said arm to said shaft so that said movement of said weight outward in response to rotation of said element produces said torque moment urging said cam means toward said first position.

14. A stepless variable-stroke drive as in claim 13 further comprising means for adjustably damping the pivotal movement of said arm.

15. A stepless variable-stroke drive as in claim 14 wherein said adjustable damping means comprises:

a sleeve of flexible friction material about which said arm is journaled; and a threaded shaft telescoped through said sleeve and adapted to adjustably compress said sleeve, thereby varying the frictional engagement of the outer portion of said sleeve with said arm.

16. A stepless variable-stroke drive as in claim 13 further comprising a relatively light spring yieldably biasing said arm toward the position in which the mass is radially outward.

17. A stepless variable-stroke drive as in claim 12 wherein the pivotal mounting of said cam means is positioned relative to the axis of said input element to produce a predetermined relationship between the distance from the effective center of said cam means to the pivotal mounting thereof and the pivotal mounting to the central axis of said input element.

18. A stepless variable-stroke drive as in claim 12 further comprising means for adjustably positioning the pivot point of said cam means to achieve said predetermined relationship.

19. A stepless variable-stroke drive as in claim 12 wherein said torque-producing means comprises:

a yieldable urging means acting on said cam means to produce a torque moment about the pivotal mounting thereof in a direction urging it toward said first position; and a means acting on said cam means to produce a torque moment about the pivotal mounting thereof in a direction urging it toward said first position in response to centrifugal force.

20. A stepless variable-stroke drive as in claim 19 wherein:

said cam means is pivotally mounted by mounting on a shaft journaled by said input element; and said yieldable urging means and centrifugally responsive means both act on said shaft to pivot said cam means toward said first position.

* * * * *

UNITED STATES PATENT OFFICE
CERTIFICATE OF CORRECTION

Patent No. 3,803,932    Dated April 16, 1974

Inventor(s)    Clive Waddington

It is certified that error appears in the above-identified patent and that said Letters Patent are hereby corrected as shown below:

In line 1 of the abstract, "each" should read -- such --. Column 6, line 29, "would" should read -- rate --; line 36, cancel "he 24".

Signed and sealed this 24th day of September 1974.

(SEAL)
Attest:

McCOY M. GIBSON JR.
Attesting Officer

C. MARSHALL DANN
Commissioner of Patents